June 2, 1925.
S. D. HARTOG
CONNECTING ROD
Filed Feb. 26, 1923
1,540,523
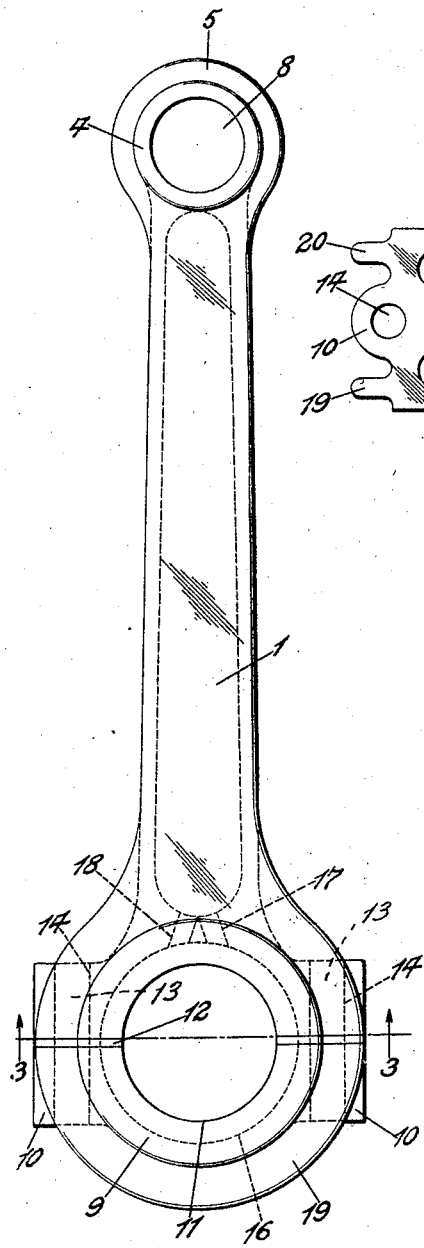
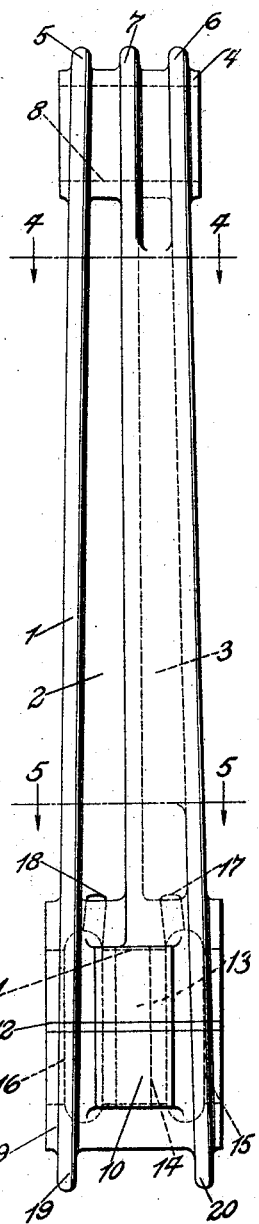
Inventor:
Stephen D. Hartog,
By Rippey Kingsland
His Attorneys.

Patented June 2, 1925.

1,540,523

UNITED STATES PATENT OFFICE.

STEPHEN D. HARTOG, OF BELLEVILLE, ILLINOIS.

CONNECTING ROD.

Application filed February 26, 1923. Serial No. 621,261.

*To all whom it may concern:*

Be it known that I, STEPHEN D. HARTOG, a citizen of the United States, residing at the city of Belleville, St. Clair County, Illinois, have invented a new and useful Improvement in Connecting Rods, of which the following is a specification.

This invention relates to improvements in connecting rods, and consists in the novel construction hereinafter disclosed.

An object of the invention is to provide as a new article of manufacture a connecting rod that may be made of light metal having the conformation and design to give it a high degree of strength.

Another object of the invention is to provide as a new article of manufacture a connecting rod having novel means for lubricating the crank shaft bearing.

Another object of the invention is to provide as a new article of manufacture a connecting rod having fins encompassing the bearing portions of the rod, whereby the heat from the bearings is conducted over an extended radiating surface to maintain the bearing sections in a cooled condition.

With the foregoing as well as additional advantageous features in view, I have produced a connecting rod of the structure hereinafter more fully disclosed, reference being made to the accompanying drawing in which Fig. 1 is a side elevation of the connecting rod.

Fig. 2 is a front elevation of the same.

Fig. 3 is a cross section taken on the line 3—3 of Fig. 1.

Fig. 4 is a cross section taken on the line 4—4 of Fig. 2.

Fig. 5 is a cross section taken on the line 5—5 of Fig. 2.

In the embodiment of the invention illustrated in the drawing the body portion of the connecting rod is shown as formed of a cast wall 1 substantially S-shape in cross section providing approximately parallel reverse channels 2 and 3 in the front and rear respectively of the connecting rod.

The side walls incline inwardly from the crank bearing end to the wrist pin bearing end as indicated by a comparison of Figs. 4 and 5 of the drawing.

The upper end of the body portion of the connecting rod carries a cylindrical enlargement 4 and the edges of the wall 1 develop into substantially annular ribs 5 and 6 respectively. An intermediate rib 7 extends outwardly from the wall of the cylindrical portion 4. The cylindrical portion 4 is bored out forming an orifice 8 for the reception of the wrist pin. The purpose of the ribs 5, 6 and 7 is to form an extended radiating surface for maintaining the wrist pin bearing in a cool condition.

At the lower end of the connecting rod body is formed a cylindrical portion 9, the front and back walls of which are provided with a substantially semi-circular vertical extension 10. The portion 9 is bored out at the center forming an orifice 11 constituting the crank shaft journal bearing, and the side walls are parted substantially on an intermediate horizontal line 12 so as to form the bearing in two portions in order to make the proper adjustment with the crank shaft arm. The two sections of the bearings are held together by pins 13 extending through vertical openings 14 in the portions 10.

The inner surface of the cylindrical portion 9 has parallel annular grooves 15 and 16 therein, and passage ways 17 and 18 are cut through the upper wall of the portion 9 at the base of the channels 2 and 3 respectively.

It will be noted that at the base of each channel 2 and 3 respectively there is formed a pocket in which lubricating oil accumulates by the oscillation of the connecting rod in the crank case and that the oil pocketed at the base of the channels is free to flow through the openings 17 and 18 to the grooves 15 and 16 for lubricating the crank shaft journal. It will also be noted that the wall 1 is extended downwardly at each side forming flanges or ribs 19 and 20 encompassing the bearing portion 9. These ribs serve to form an extended radiating surface to maintain the bearing connection between the connecting rod and the crank shaft in a cool condition.

The connecting rod is preferably made of a metal casting, the greater proportion of which is aluminum. It is possible to make a connecting rod because of the novel construction thereof of very light material and at the same time increasing the tensile strength thereof.

I am aware that the invention may be modified in numerous particulars without departing from the spirit and scope thereof. I do not limit myself to unessential particulars, but what I claim and desire to secure by Letters Patent is:—

1. As a new article of manufacture, a connecting rod comprising a continuous wall shaped to form parallel channels in opposite faces thereof in which the edges are spaced from the remaining portion, said channels overlapping each other, a wrist pin bearing carried at one end of said rod, and a bearing portion at the opposite end of said rod.

2. As a new article of manufacture, a connecting rod comprising a continuous wall substantially S-shaped in cross section in which the edges are spaced from the remaining portion, a wrist pin bearing carried at one end of said rod, and a split bearing portion at the opposite end of said rod.

3. As a new article of manufacture, a connecting rod having a body portion formed of a continuous wall substantially S-shaped in cross section having an open longitudinal channel at each of two sides, a wrist pin bearing carried at one end of the body portion, a split bearing portion at the opposite end of said body portion, and ribs formed on the outer wall of said bearing portions respectively.

4. As a new article of manufacture, a connecting rod having a body portion formed of a continuous wall providing laterally spaced channels in opposite faces of said body portion and opening toward opposite sides of the axes of the bearings hereinafter mentioned, said channels overlapping each other, a wrist pin bearing carried by one end of the body portion, a bearing portion at the opposite end of said body portion, and extensions on the ends of the body portion around each of said bearings forming ribs effectively to increase the strength of the connecting rod and to provide heat radiating surfaces for maintaining the bearings in a cooled condition.

5. As a new article of manufacture a connecting rod comprising an integral casting substantially S-shaped in cross section and having channels opening in opposite directions, a bearing integral with one end of said casting, ribs extending around said bearing in continuation of the edges of the S of said casting, a half bearing member integral with the opposite end of said casting, and a detachable half bearing member connected with said first named half bearing member and forming a complete bearing.

6. As a new article of manufacture, a connecting rod comprising a body portion having channels in its opposite face, said channels overlapping each other and being of a depth substantially equal to the width of the rod, bearings carried at each end of said body portion, there being cavities formed at the base of said channels adjacent to the lower bearing portion of the rod adapted to receive a lubricant, and passage ways leading from the cavities through the wall of the bearing.

7. As a new article of manufacture, a connecting rod having a metallic composition the greater proportion of which consists of aluminum, said rod comprising a body portion formed from a continuous wall cast to form the body portion substantially S-shape in cross section, a split connecting rod bearing at the lower end of said rod, a wrist pin bearing at the opposite end of said rod, there being relatively deep cavities formed at the base of the channels in the body portion adapted to receive and contain lubricant, and passage ways leading from said cavities through the wall of the bearing.

8. A connecting rod of the character described having an open channel on each of two opposite sides, each channel extending beyond the bottom wall of the other channel.

9. A connecting rod of the character described having an open channel on each of two opposite sides, each channel extending beyond the bottom wall of the other channel transversely of the axes of the bearings, and a bearing at each end of said rod.

10. A connecting rod of the character described comprising a casting having a wrist pin opening at its upper end and including a bearing portion at its lower end and having an open channel in each of two opposite sides extending from the upper end of the casting to said bearing portion, each channel extending beyond the bottom wall of the other channel transversely of the axis of said bearing portion and said wrist pin opening and having an opening from each of said channels through said bearing portion.

11. A connecting rod of the character described comprising a casting having a bearing at each end thereof and having a channel on each of two opposite sides opening outwardly transversely of the axes of said bearings and each channel extending beyond the bottom wall of the other channel, and the outer walls of said channels uniting integrally with said bearings inwardly a short distance from the ends of said bearings.

STEPHEN D. HARTOG.